United States Patent
Bodmer et al.

(10) Patent No.: US 6,263,260 B1
(45) Date of Patent: Jul. 17, 2001

(54) HOME AND BUILDING AUTOMATION SYSTEM

(75) Inventors: James Bodmer, Oberlunkhofen (CH); Walter Karl Pfeiffer, Pliezhausen (DE)

(73) Assignee: HTS High Technology Systems AG (CH)

( * ) Notice: Subject to any disclaimer, the term of this patent is extended or adjusted under 35 U.S.C. 154(b) by 0 days.

(21) Appl. No.: 09/180,639

(22) PCT Filed: May 20, 1997

(86) PCT No.: PCT/CH97/00194

§ 371 Date: Nov. 11, 1998

§ 102(e) Date: Nov. 11, 1998

(87) PCT Pub. No.: WO97/44720

PCT Pub. Date: Nov. 27, 1997

(30) Foreign Application Priority Data

May 21, 1996 (CH) .................................................. 1270/96

(51) Int. Cl.[7] .............................. G05D 23/19; G05B 13/02
(52) U.S. Cl. ............................ 700/275; 700/48; 236/46 R
(58) Field of Search ............................... 700/22, 2, 10–14, 700/20, 28–31, 36, 42, 44, 45, 47, 48–50, 275–278, 295, 296; 236/46 R, 49.3; 340/522; 702/183, 181, 187

(56) References Cited

U.S. PATENT DOCUMENTS

| | | | |
|---|---|---|---|
| 4,407,447 | * 10/1983 | Sayegh | ................................. 236/49.3 |
| 5,088,645 | 2/1992 | Bell | ..................................... 236/46 R |
| 5,148,977 | 9/1992 | Hihino et al. | ........................ 236/49.3 |
| 5,276,427 | * 1/1994 | Peterson | ................................ 340/522 |
| 6,108,614 | * 8/2000 | Lincoln et al. | ....................... 702/183 |

FOREIGN PATENT DOCUMENTS

| | | |
|---|---|---|
| 683473 | 3/1994 | (CH) . |
| 684449 | 9/1994 | (CH) . |
| 19514027 | 1/1996 | (DE) . |
| 0444308 | 9/1991 | (EP) . |
| 0589448 | 3/1994 | (EP) . |
| 0631219 | 12/1994 | (EP) . |
| 4-155136 | * 5/1992 | (JP) ....................................... 236/51 |

OTHER PUBLICATIONS

Publication Infel–Info, dated Jan., 1996.

* cited by examiner

Primary Examiner—William Grant
Assistant Examiner—Steven R. Garland
(74) Attorney, Agent, or Firm—Bachman & LaPointe, P.C.

(57) ABSTRACT

Process and system for programmed control of a home and building automation system, for saving energy and improving comfort, with the process being performed by means of software and presence and activity monitoring sensors. The software includes first adaptive algorithms controlled by signals from the presence and activity monitoring sensors, for continuously detecting and storing systematic and stochastic behavior of at least one person in a room and over several rooms, and including second modifiable deterministic algorithms for adapting and triggering actuators of installations or groups of installations. The algorithms are combined with external parameters into a third algorithm to optimize the automation system as a whole and to adjust the first and second algorithms by means of feedback.

15 Claims, 2 Drawing Sheets

HOME AND BUILDING AUTOMATION SYSTEM

BACKGROUND OF THE INVENTION

The invention relates to a process for optimised control of a home and building automation system by way of software and sensors for monitoring persons, where the automation system, for energy saving and comfort improvement purposes, triggers actuators for installations or groups of installations as required. The invention also concerns an automation system for performance of the process and its application.

Home and building automation systems have already been proposed and implemented in many forms with a view to improving comfort. Government objectives and increasing environmental awareness contribute to the generally growing need to reduce energy consumption in order to protect global resources.

As early as the beginning of the 80's, the cooling and heating power of an air-conditioning system could be influenced in individual rooms in terms of comfort and energy in that an energy control system triggered by presence sensors was used, for example that described in U.S. Pat. No. 4,407,447. When the presence of a person in a room is according to this patent specification the temperature is adjusted from an uncontrolled room temperature to a pre-specified nominal temperature by the supply of corresponding warm or cold air. When this person leaves the room, the air supply is cut off again and hence the energy consumption as a whole reduced. This system thus responds directly to direct requirements caused by the presence of at least one person, but has the disadvantage that in regard to the comfort system it has an inherent inertia. For example the thermal inertia of a room to be heated or cooled cannot be taken into account sufficiently or at all.

U.S. Pat. No. 4,567,557 describes a further developed building automation system referred to as intelligent. This has a centrally organised system with a multiplicity of input side sensors which send their information or control commands to a central processor, and actuators on the output side which receive control commands from the processor. The decisive factor in this system is firstly the centralistic approach, where all information must reach the central processor, and secondly the deterministic approach where all possible cases and combinations are programmed and stored as "behaviour patterns" for subsequent retrieval.

During the following years, systems have been developed and marketed known as "total home systems". These comprise lighting and object control via the installed power network, which can use the existing infrastructure without significant structural changes. The system consists of a central unit and various receiver units such as switches, dimmers and shutter control. As stated, the existing 230 V network line with sockets is used as the signal line. Thus complex control sequences for different procedural requirements can be stored and repeated within a building.

A deterministic approach is common to all known systems, in which preprogrammed sequences are triggered under time-control, at the request of sensors or by human intervention. Thus these systems, also known as mode programmes, can be used optimally only for specified situations and with time restrictions.

A change in user requirements requires reprogramming of the system, which is beyond the capacity of, or frightens a user, normally a layman. One example here is the change of use of a child's bedroom into a storage room, which in principle creates different conditions. Thus the known systems can only respond with difficulty, or unsatisfactorily, or not at all to spontaneous changes of environment and/or user behaviour. Thus for example a home automation system for households with professional family members is programmed to lower the temperature during the day. If one family member remains at home because of illness, the system responds incorrectly. Manual intervention is required. Resetting to normal mode is then often forgotten.

CH, A 683473 discloses a process for electronically delayed disconnection of the light with a passive infrared sensor as a movement sensor. Thus a specified output value or a stored learned value for time delay can be entered. This value is adapted automatically and continuously to the intensity of movement in the scope of the passive infrared sensor, and on any change of movement intensity a new time delay is continuously set. One specific problem, the optimum delay in disconnection of the lighting, is therefore no longer established exclusively deterministically, an intelligent disconnection delay for the light is matched to the user behaviour.

EP, A 0631219 describes a process for temperature control and adjustment in individual living and working rooms which are used only rarely but with a certain regularity. Constant living habits are taken into account, which should bring optimum comfort with maximum energy saving. A set value is modified to the regularities to be set in the room used as a function of presence times detected by the presence sensor for the following days according to a fuzzy algorithm. The at least partly stochastic behaviour of residents cannot be detected by the process.

The largely similar automatic temperature control and regulation system described in U.S. Pat. No. 5,088,645 is related to individual rooms and has no overall strategy. The algorithms do not contain any separation of deterministic and stochastic behaviour. Disruption factors are integrated by the system.

SUMMARY OF THE INVENTION

The present invention is based on the task of creating a process and a device of the type described initially which reduces to a minimum the process-controlled intelligence, the deterministic components of the home and building automation system, adapts automatically to the at least partly stochastic behaviour of persons in the building and hence allows both energy savings and comfort improvement.

In relation to the process, the task is solved according to the invention in that adaptive self-learning algorithms of the software, controlled by signals from presence and activity monitoring sensors, continuously store the systematic and stochastic behaviour of at least one person in the room concerned and over several rooms, adapt and trigger actuators in conjunction with modifiable deterministic algorithms, where the room-related optimisation algorithms are combined with external parameters into an algorithm to optimise the automation system as a whole and the individual room algorithms are adapted accordingly as feedback. Further and special design forms of the process are the subject of dependent claims.

The presence and activity monitoring with presence and activity-controlled control loops, the neuronal networks with their own computers which detect and evaluate the regular (systematic) and random (stochastic) behaviour, are of greatest importance.

The sensors arranged on the input side of the software, which is usually standard software or software adaptable with specialist knowledge which is stored in a CPU or processor, are for example movement sensors of all types. The most common are passive infrared sensors such as described for example in CH,A 683473 or the company brochure by High Technology Systems AG, CH-8306 Bruttisellen dated Dec. 3, rd 1994 (second issue January 1996). Further passive systems for example detect the noise or pressure waves generated by persons. Movement sensors can also be constructed on active principles, e.g. by emitting an ultrasound or microwave field or by the reception of a field influenced by a moving person. Changes in a static electrical or electromagnetic field can also be detected and the signals passed on for analysis by the software.

External parameters or information sources included in the room-related optimisation algorithms are for example the weather, the external temperature, safety modes or weather forecasts.

Sensors are not however restricted to movement sensors. For example smoke sensors, thermostats, light detectors and other sensors are suitable as input signal generators, to contribute to solution of the task according to the invention and/or to supplement this.

The electrical signals output by the computer, CPU or processor with the software, trigger allocated installations or installation groups via actuators. This is done directly or via intermediate components, for example a summing point and a PID regulator for a presence and activity-controlled control loop. The actuators can be single or multi-stage relays or other electromechanical devices known to the expert with normally open, normally closed or switching contacts. Installations or installation groups are for example lighting bodies, heating, valves for the flow of heating and cooling media, motors for venetian blinds and alarm systems.

According to the invention, the monitoring applies not only to the presence but also the activity of at least one person present in the detection area of a room monitoring system. The activity is stored and used by the software to trigger actuators.

Thus the initial models of user behaviour of at least one person which are stored on installation of the automatic system are adapted permanently to the changing user behaviour and the collected experience used as a prediction basis for the most probable following actions. By means of learning and probability/predictive algorithms, stochastically changing behavioural patterns can be recorded. This is carried out preferably, but not exclusively, in a CPU or a central processor but includes neuronal networks. These are network computers connected in the manner of nerve cells with radiating fibres which are controlled by a central software but which work largely autonomously. To input algorithms and trigger alarms, fuzzy logic known to the expert as non-sharp logic is used. Originally fuzzy logic was used to describe incomplete and/or inexact data records and process these mechanically. Today fuzzy logic is widely used in control and regulation technology, in particular when good results cannot be achieved with conventional regulators.

Using the neuronal network and fuzzy logic, adaptive self-learning algorithms of the software can detect as systematic a non-stochastic behaviour of at least one person and adapt the stored model continuously. The evaluation of such a systematic user behaviour is used by the software as a prediction basis for the most probable following actions, and is stored and used to trigger actuators. Deviations from certain systematic user behaviour can also trigger an alarm. This is not done immediately but suitably after a time delay, for example after 5 to 15 minutes.

The adaptive self-learning algorithms of the software can also receive external control signals. This is done for example via a connecting network of databases, in particular via the internet. These control signals are used to trigger actuators, also in combination with internal control signals.

In a further variant of the invention, the sensitivity is automatically adapted to the user. Here the sensitivity of an automation system on movement is increased by reducing the response threshold if at least one person is present in and/or enters the room. The heat difference then activates a second more sensitive stage and the sensor detects the finest body movements in the range from 10 to 20 cm. On each movement detected, the switch time predetermined or calculated from the stochastic behaviour of the person or persons is renewed with increased sensitivity. For details see CH,A 684449 and publication Infel-Info January 1996 pages 1 to 4.

If during an adjustable time period the total absence of persons and/or no activity is detected, the building automatic system automatically switches to alarm mode.

With reference to the automation system for performance of the process, the task according to the invention is solved in that for monitoring the presence and activity of persons at least one sensor is used per room, these sensors are networked with presence and activity-controlled control loops, and these networks contain computers with software-modifiable, deterministic and adaptive self-learning algorithms. Further and special design forms of the automation system are the subject of dependent claims.

The networks with the computers are preferably structured neuronally.

The networked sensors, essentially movement sensors of all types, depend on the geometry, structure and furnishings of the room to be monitored. A presence sensor ECO-IR 360 by High Technology Systems AG, CH-8306 Bruttisellen, for ceiling mounting allows full 360° cover. Evidently certain rooms or parts of rooms can also be screened from the monitoring if required. Also other sensors can be connected which serve merely to trigger alarms, for example a smoke alarm or thermostat.

The sensors can be networked via the electrical installation network. In particular in new buildings, the networking comprises at least one standard data bus, suitably an LON (Local Operating Network) or EIB (European Installation Bus) or PLC (Power Line Communication).

The applications of the process according to the invention are practically unlimited, in particular for the control of lighting, heating, air conditioning, ventilation, darkening, hot water preparation, control of electrical equipment such as washing machines and/or alarms etc.

The advantages of the process according to the invention and the device operated with this can be summarised as follows:

The multiplicity of possible combinations of cases need not be preprogrammed, simple rules can be applied such as for example "the heating is not switched off in the morning until everyone has been to the bathroom".

A user behaviour recognised as systematic is used as a prediction basis for the most probable stochastic following actions and corresponding actuators are triggered. The user behaviour is continuously modified automatically.

A deviation from certain systematic user behaviour can be used to trigger an alarm after a time delay.

The home and building automation system allows considerable energy saving, improves comfort and increases the safety of the user.

BRIEF DESCRIPTION OF THE DRAWINGS

The state of the art and the invention are explained in more detail using the design examples shown in the drawing. These show.

DETAILED DESCRIPTION OF PREFERRED EMBODIMENTS

Figure 1:
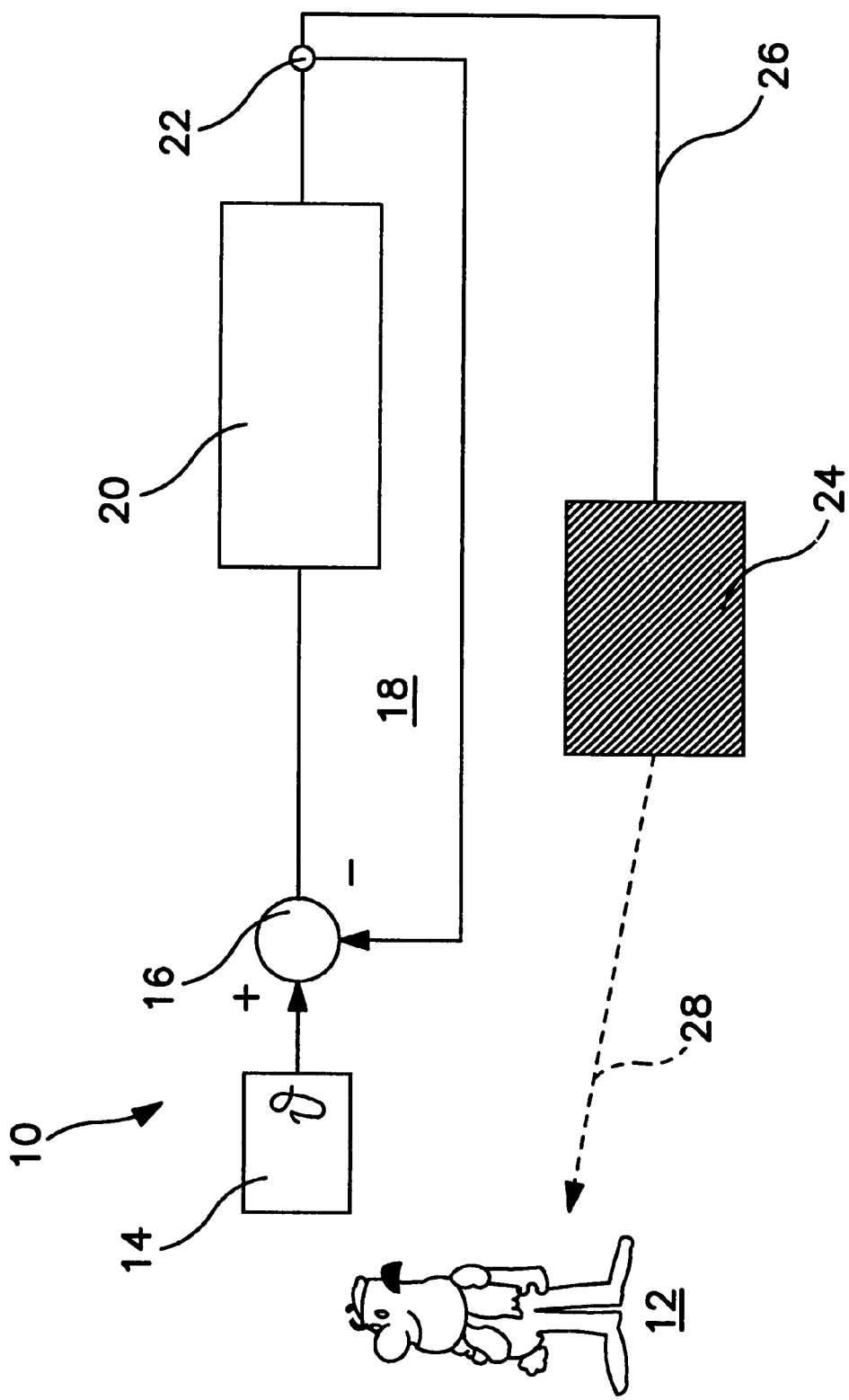
FIG. 1 a known heating control system with conventional control loop.

A known heating control 10 according to FIG. 1 is adapted to the comfort of a user 12 who selects the room temperature pleasant for him via a manually adjustable thermostat 14. This gives an electrical signal, the nominal value marked "+", to a summing point 16. A conventional control loop 18 leads via a PID regulator 20 to a temperature sensor 22 for the provisional temperature of a heating system 24 and from there back to the summing point 16 where the actual value marked "−" is entered to determine the nominal-actual difference.

Between the temperature sensor 22 and the heating system 24 is shown a water pipe 26 for the supply of the heating medium. A dotted arrow 28 indicates the subjective temperature perception of the user 12. If he finds this temperature too high or too low, he adjusts the thermostat 14 manually which gives a new nominal value for the summing point 16.

Figure 2:
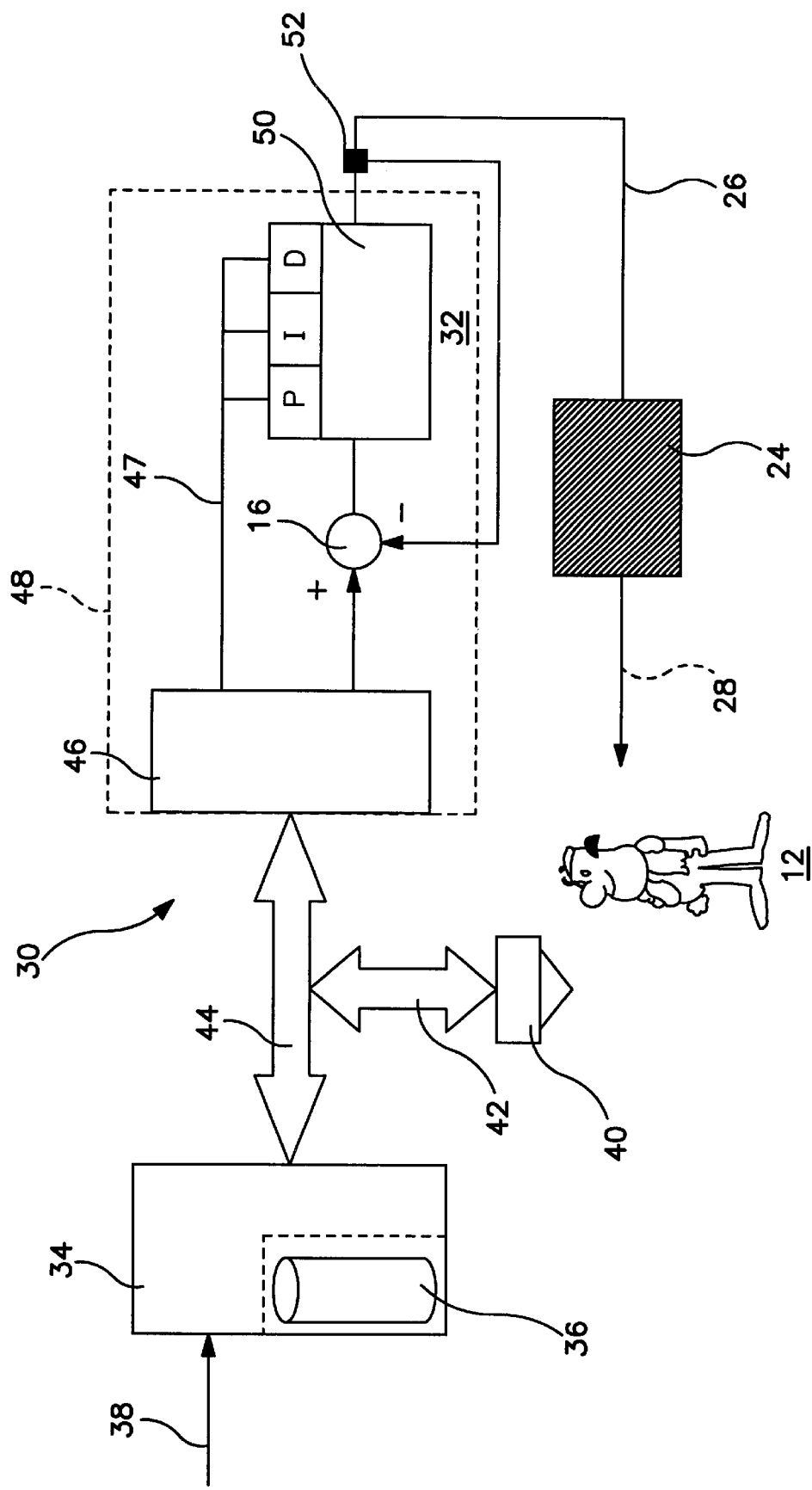
FIG. 2 a home and building automation system according to the invention with a presence and activity-controlled control loop.

FIG. 2 shows a home and building automation system 30 with a presence and activity-controlled control loop 32.

A processor 34 with software comprises the adaptive home automation and modifiable behaviour pattern database 36. An arrow 38 indicates a connection to the internet.

The presence and activities of the user 12 are monitored by a movement sensor 40, in the present case a PIR regulator of the known type. The electrical signals generated by the movement sensor are supplied to a databus 42 which opens into a further databus 44 also indicated by a double arrow. This connects the processor 34 to a bus interface 46.

The bus interface 46 forms a functional unit with the presence and activity-controlled control loop 32 as indicated by a dotted rectangle 48. Electrical lines 47 branching out of the bus interface 46 open into adaptively adjustable P (proportional), I (integral) and D (differential) PID regulator 50 via which runs the presence and activity-controlled control loop 32.

The bus interface 46 also outputs electrical impulses marked "+", the nominal values, to the summing point 16. The electrical pulses marked "−" for the actual value are supplied via the control circuit 32 to form the nominal-actual control difference. P, I and D are adjusted adaptively as stated.

Depending on the continuously modified behaviour pattern of the user 12, the database 36 of processor 34 and/or the latter itself or the algorithms concerned via database 34, bus interface 46 and control circuit 36 trigger an actuator 52 which opens the water line 26 of the heating system 24. For the sake of simplicity not all of this chain is listed elsewhere, but reference is made merely to the triggering of actuator 52.

On entering the room, the user finds the room heated to the temperature he requires at the time controlled according to behaviour with minimum energy consumption.

EXAMPLE 1

On conversion from summertime to wintertime and vice versa, the normal daily rhythm of persons living in a household shifts by one hour. The home automation system records the modified behaviour and shifts the provision of hot water in the morning hours accordingly by this hour without any intervention of the user being necessary. The change is prepared in that a signal is received and analysed which announces summertime or wintertime.

EXAMPLE 2

A single person leaves the bedroom at night for a short time for example to visit the WC, but always returns at the latest 10 minutes later. If this person leaves the bedroom, but has an accident or loses consciousness, the system will derive an alarm from this. Using the fuzzy logic methods and the neuronal network, it is no longer necessary to predict and program in advance all possible cases and combinations, according to the invention it is sufficient to enter a simple rule "on abnormal behaviour, trigger an alarm after a time delay". Evidently for special cases, for example getting up to read or watch TV, the alarm is bridged automatically by movement sensors or manually by pushing a button.

EXAMPLE 3

In the installation of a home automation system, the starting model for user behaviour specifies that the family begin the day at 06.00 with a shower and then take breakfast in the kitchen between 06.30 and 07.00. The requirement for this model is that the bathroom is heated sufficiently early depending on the structural features for a required room temperature of for example 22° C. to be achieved at 06.00. From 06.30 the bathroom heating is switched off again. A similar procedure applies to the kitchen heating.

After some time, a timetable change applies to one of the children such that he uses the bathroom for the first time at 07.30, but does not use the kitchen at all. This behaviour deviating from the original model is recognised by the implemented algorithms of the software as systematic and the model is adapted accordingly. The bathroom heating is maintained at 22° C. until 08.00. The kitchen heating remains unchanged.

If a deviation from the usual habits occurs only sporadically, the automation system, via the stored probability functions (probability algorithms) selects an extension of the bathroom heating according to the probability of usage such that when the event occurs the quickest possible adaptation of room temperature is achieved and the total energy consumption is kept as low as possible as an extra criterion. In addition the automation system, because of the neuronal network structure of presence and activity sensors, will find that this case occurs when the person concerned has not been active accordingly in his bedroom by 06.25 at the latest.

Also additional optimisation can be carried out via external predictive information from the meteorological service. If for example a bad weather front is approaching, this can lead overnight to a temperature drop which requires the heating phase for the bathroom to begin earlier. Thanks to the prediction, the automation system according to the invention has this information before the event occurs and can trigger the heating command earlier than would be the case for example with an external temperature sensor.

What is claimed is:

1. Process which comprises: providing programmed control of a home and building automation system, for saving energy and improving comfort, said process performed by means of software and presence and activity monitoring sensors; said software including first adaptive algorithms controlled by signals from the presence and activity monitoring sensors, for continuously detecting and storing systematic and stochastic behavior of at least one person in a room and over several rooms, and including second modifiable deterministic algorithms for adapting and triggering actuators of installations; said algorithms being combined with external parameters into a third algorithm to optimize the automation system as a whole and to adjust the first and second algorithms by means of feedback; wherein on installation of the automation system a first model of user behavior of at least one person is entered as starting software in at least one neural network computer.

2. Process according to claim 1, wherein said deterministic algorithms adapt and trigger actuators of groups of installations.

3. Process according to claim 1, wherein on deviation from said systematic user behavior alarms are triggered.

4. Process according to claim 3, wherein said alarms are triggered after an adjustable time interval.

5. Process according to claim 4, wherein said adjustable time interval is from 5 to 15 minutes.

6. Process according to claim 3, wherein the software control and alarm triggering takes place by means of fuzzy logic and neural networks.

7. Process according to claim 3, wherein the automation system automatically switches to an alarm mode in response to one of total absence of persons and lack of activity.

8. Process according to claim 1, wherein the automation system receives external control signals via a connecting network to databases or external information sources and the internet and analyzes these prior to triggering actuators.

9. Process according to claim 1, wherein said external parameters include at least one of external temperature, weather forecasts and safety modes.

10. Process according to claim 1, wherein sensitivity of said automation system including movement sensors is modified automatically by reducing the response threshold to suit a user.

11. Home and building automation system for performing a process according to claim 1, which comprises a system adapted to trigger actuators of installations and including at least one sensor per room for monitoring presence and activity of at least one person, said system further including a network of sensors covering several rooms with presence and activity controlled control loops, and computers for optimizing by means of software control of the automation system as a function of the presence of persons and said external parameters, said software including said first adaptive algorithms and said second modifiable deterministic algorithms.

12. Automation system according to claim 11, where system is adapted to trigger actuators of groups of installations.

13. Automation system according to claim 11, wherein at least one of smoke sensors, thermostats and light detectors are integrated as input signal generators.

14. Automation system according to claim 13, wherein the computers comprise at least one neural network computer including a standard databus.

15. Automation system according to claim 13, wherein a bus interface is connected to a PID regulator and, to transfer electrical signals as positive nominal values, to at least one summing point which is integrated with a PID regulator and an actuator in a presence and activity controlled control loop.

* * * * *